April 13, 1965 F. TRINCA 3,177,724
TIRE GAUGE HOUSING
Filed Sept. 4, 1963 2 Sheets-Sheet 1

INVENTOR
FREDERICK TRINCA

BY *Albert G. Kramer*
ATTORNEY

April 13, 1965 F. TRINCA 3,177,724
TIRE GAUGE HOUSING
Filed Sept. 4, 1963
2 Sheets-Sheet 2
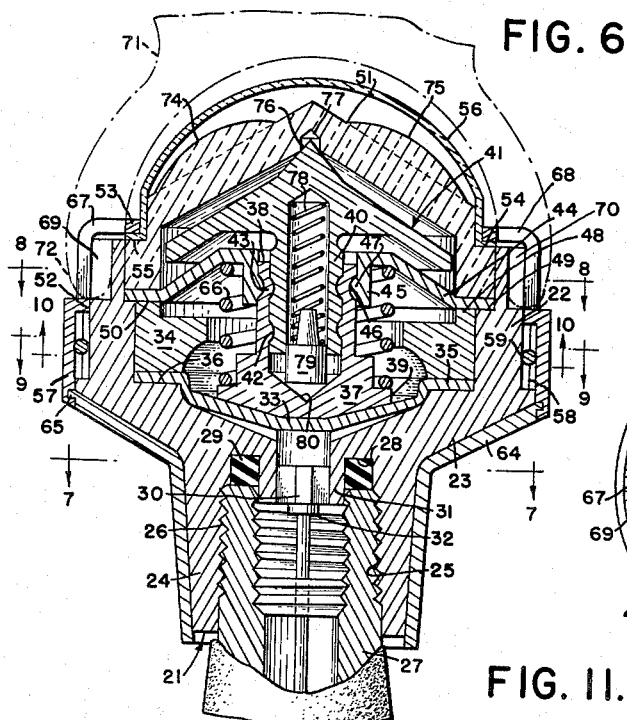
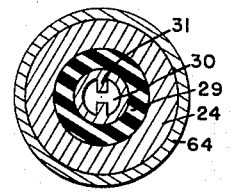
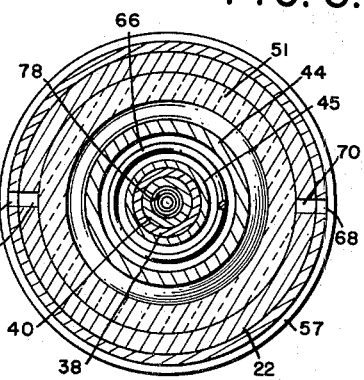
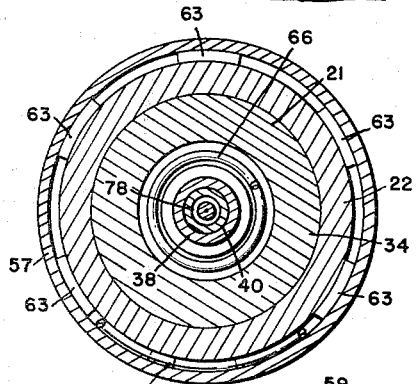
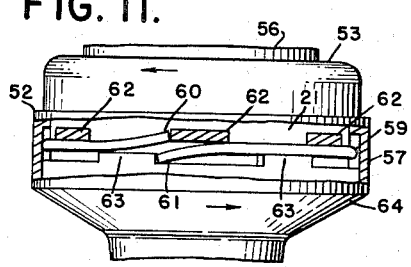
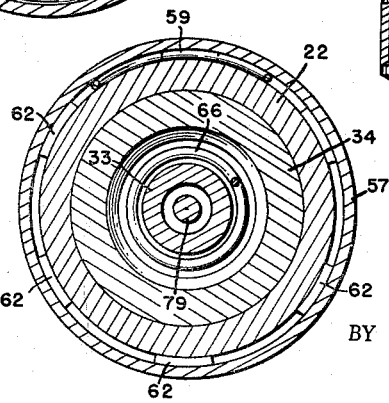
INVENTOR
FREDERICK TRINCA
BY Albert J. Kramer
ATTORNEY

United States Patent Office 3,177,724
Patented Apr. 13, 1965

3,177,724
TIRE GAUGE HOUSING
Frederick Trinca, 64—12 83rd St., Middle Village, N.Y.
Filed Sept. 4, 1963, Ser. No. 306,505
7 Claims. (Cl. 73—431)

This is a continuation-in-part of my copending application Serial No. 77,239, filed December 20, 1960, now abandoned.

This invention relates to tire gauges and it is more particularly concerned with such gauges that can be attached to the valve of a conventional automobile tire and permitted to remain there for the purpose of constantly indicating the air pressure in the tire.

An object of the invention is the provision of means for attaching the gauge to the valve with a measure of security against unauthorized removal of the conventional wheel disc.

Another object of the invention is the provision of means for readily installing such a gauge on the valve of the tire without the need of any special equipment, such as a key, but which can only be removed by the use of a special key.

A further object of the invention is the provision of a gauge of the type mentioned which can be made relatively small and inconspicuous, yet readable from a substantial distance, such as by a person in a standing position alongside the tire.

A still further object of the invention is the provision of such a gauge which is rugged, durable and not likely to get out of order over prolonged periods of time.

These objects and still further objects, advantages, and features of the invention will appear more fully from the following description taken in conjunction with the accompanying drawing showing an embodiment of the invention by way of illustration and not by way of limitation.

In the drawing:

FIG. 6 is a sectional view along the line 6—6 of FIG. 3, including a portion of a typical valve to which it is shown attached.

FIG. 7 is a sectional view along the line 7—7 of FIG. 6.

FIG. 8 is a sectional view along the line 8—8 of FIG. 6.

FIG. 9 is a sectional view along the line 9—9 of FIG. 6.

FIG. 10 is a sectional view along the line 10—10 of FIG. 6.

FIGS. 11 and 12 are elevational views of a fragmentary portion of the embodiment, partly broken away, illustrating the function of the ratchet coil and cooperating abutment members.

Figure 1:
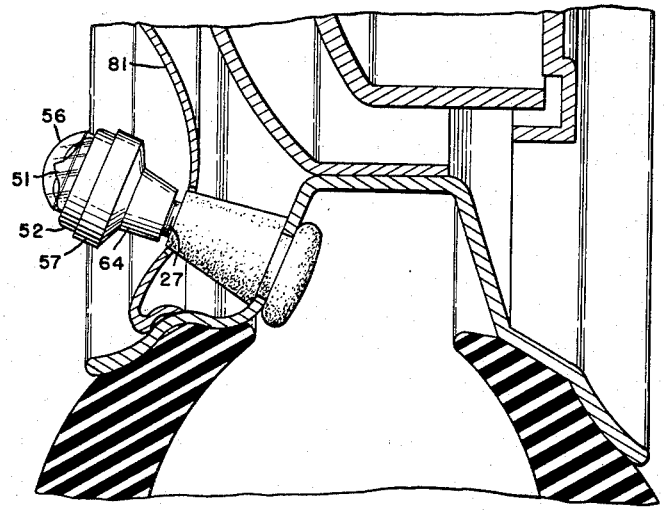
FIG. 1 is a fragmentary sectional view through a conventional automobile wheel showing the embodiment installed on the valve of the tire thereon.
Figure 3:
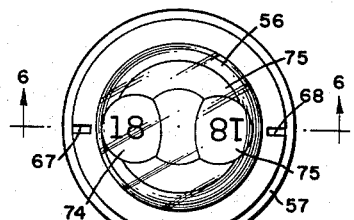
FIG. 3 is a top plan view of the embodiment.
Figure 2:
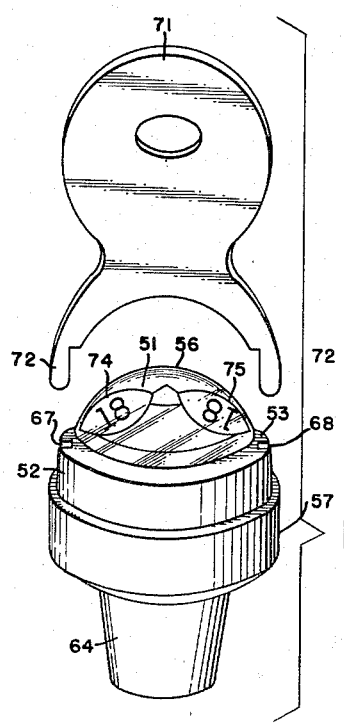
FIG. 2 is a perspective view of the embodiment including a key member used to release the gauge from engagement with a valve.
Figure 4:
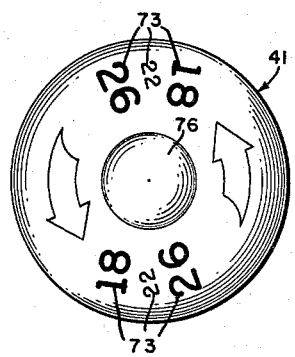
FIG. 4 is a top plan view of the rotatable dial member forming a part of the embodiment.
Figure 5:
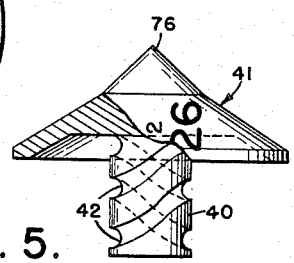
FIG. 5 is an elevational view of said dial member, partly broken away.

Referring with more particularity to the drawing in which like numerals designate like parts, the embodiment illustrated comprises a cup-shaped casing 21 having an annular side wall 22 and a bottom wall 23. A hollow stem portion 24 is integral with the casing and it projects downwardly from the center of the bottom wall 23. The inner surface of the stem portion is provided with threads 25 to engage threads 26 of a conventional tire valve 27.

The interior of the stem 24 has an annular channel 28 for retention of a sealing ring 29 against the outer end of the tire valve.

A central passageway 30 is provided through the bottom wall portion 23 centrally of the stem in order to communicate the air pressure in the tire to the mechanism of the gauge. The wall 31 between the channel 28 and the passageway is fashioned so as to abut the valve pin 32 when the device is in place, as shown in FIG. 6, and urge the pin down to open the valve, thereby effecting communication of the air pressure in the tire with the gauge mechanism through the passageway 30.

A flexible diaphragm 33, such as of rubber, neoprene, or other suitable material, is disposed across the bottom wall 23 and it is held in position by a ring clamp 34 which frictionally negates the inner surfaces of the wall portion 22 and holds an annular rim portion 35 of the diaphragm against an upwardly facing annular seat 36 of the bottom wall 23.

On the center of the diaphragm 33, there is disposed an inverted mushroom-like member 37 having a hollow stem 38 and a flange 39 at the bottom. The interior of the stem 38 is adapted to slidably receive a hollow spindle 40 which forms part of the dial member 41. The outer surface of the spindle 40 is provided with a helical groove 42 which engages indentations 43 of the stem 38, whereby axial movement of the spindle 40 relative to the stem will cause the spindle to rotate.

The member 37 is held in place by a retainer plate 44 which has a central flange 45 adapted to receive the stem 38 and be snap engaged therewith by means of an annular groove 46 on the exterior wall of the stem and a matching annular ridge 47 on the flange. The outer annular edge of the plate 44 is seated on adjacent upwardly facing shoulders 48 and 49 of the seating ring 34 and wall 22, respectively, and is held thereon by the downwardly facing edge 50 of a transparent glass or plastic crown 51. The crown 51 is held in place by holding band 52 having an inwardly flanged upper lip 53 overlying an upwardly facing shoulder 54 of the crown. Between the shoulder 54 and lip 53 a flanged edge 55 of a transparent dome 56 is disposed and held in position by the band 52, substantially as shown.

The holding band 52 has an enlarged annular portion 57 offset from the adjacent wall 22 of the casing 21 to provide an annular space 58 for a ratchet coil 59. One end 60 of the coil lies above the other end 61. These ends are adapted to contact teeth 62 of the wall casing 21 and teeth 63 on the inside of the annular portion 57, respectively, when the casing is rotated clockwise as viewed in FIGS. 9 and 10 and to escape such engagement when the casing is rotated in the opposite or counterclockwise direction. The holding band 52 is held in position by a shell 64 extending over outer surfaces of the casing 21 and is freely rotatable thereon. The shell 64 is secured to the portion 57 of the band 52 by conventional annular lock joint 65 or by any other suitable conventional means.

A calibrated coil spring 66 is disposed about the stem 38 between the flange 39 and the retainer plate 44.

By these means, as the band 52 is gripped with the fingers and rotated, the device can be threadedly engaged with the tire valve because the ratchet action of the coil spring 59 in this direction of rotation (see FIG. 11) locks the rotating parts together. However, if it were desired to remove the device, simply reversing the direction of rotation would be ineffective (see FIG. 12). To provide for the removal, a pair of diametrically opposite slits 67 and 68 are provided in the bands 52 to allow exposure therethrough of a corresponding diametrical pair of depressions 69 and 70 when rotated to a position of registry.

A key 71 having a pair of prongs 72 is adapted to fit the slits 67 and 68 and the depressions 69 and 70. When the key 71 is thus inserted and turned, rotational forces can be delivered directly to the casing 21, thereby permitting the removal of the device.

The crown 51 overlies and conforms somewhat to the conical shape of the dial member 41 which contains on its upper surface indicia 73, including members designating air pressure as a function of the angular rotation of the dial member. These indicia are relatively small because of the small size of the device. However, they are readily readable by virtue of the crown 51 being thickened on opposite sides in the shape of magnification lenses 74 and 75. Thus, the pressure is correctly read when the number corresponding thereto is directly under and can be read through these magnification areas.

The upper end 76 of the dial member 41 is pointed and is rotatably mounted in a bearing 77 of the crown 51. The dial member 41 is constantly urged to this position of engagement with the bearing by means of a light thrust spring 78 in the hollow part of the shank 40, one end of the thrust spring being set against a thrust bearing member 79 pivoted on a recess 80 in the bottom of the member 37.

By these means, it is apparent that the air pressure against the bottom of the diaphragm 33 is delivered against the force of the spring 66 causing differential movement between the stem 38 and the spindle 40, resulting in a degree of rotation of the dial corresponding to the air pressure.

When the gauge is in place, as shown in FIG. 1, it also acts as a lock to provide a degree of security against unauthorized removal of the conventional wheel disc 81.

Having thus described my invention, I claim:

1. An anti-theft tire gauge housing comprising a gauge casing having a portion thereof adapted to be threadedly engaged with the threaded stem of a conventional tire valve, a shell rotatably mounted on said casing, a dome member connected to the shell, said shell and dome member together extending over substantially the entire exterior surface of the casing, and means between the shell and the casing to permit rotation of the casing by rotation of the shell in the direction only for mounting the gauge on the valve.

2. An anti-theft tire gauge housing comprising a gauge casing having a portion thereof adapted to be threadedly engaged with the threaded stem of a conventional tire valve, a shell rotatably mounted about said casing, a dome member connected to the shell, said shell and dome member together extending over substantially the entire exterior surface of the casing to cover finger-grippable portions thereof, means between the shell and the casing to permit rotation of the casing by rotation of the shell only in the direction for attaching the casing to the valve, said shell having slit openings therein to expose portions of the casing for engagement of a key member, said casing having portions thereon for engaging a key-member disposed in said openings.

3. An anti-theft tire gauge housing as defined by claim 2 and a key member for entering said slit openings and engaging the casing.

4. An anti-theft tire gauge housing comprising a gauge casing having a portion thereof adapted to be threadedly engaged with the threaded stem of a conventional tire valve, a shell rotatably mounted about said casing, a dome member connected to the shell, said shell and dome member together extending substantially over the entire exterior surface of the casing to cover finger-grippable portions thereof, and a ratchet between said shell and casing to permit co-rotation of the shell and casing in the direction only for attaching the gauge to the valve.

5. An anti-theft tire gauge housing as defined by claim 4 in which the ratchet comprises a coil spring between the shell and the casing, said shell and casing having ratchet teeth, the ends of the spring being adapted to abuttingly engage the teeth of the shell and casing, respectively, when the shell is rotated in the direction for attaching the gauge to the valve, and to slidably contact the teeth when the shell is rotated in the opposite direction.

6. An anti-theft tire gauge housing comprising a gauge casing having a portion thereof adapted to be threadedly engaged with the threaded stem of a conventional tire valve, a shell rotatably mounted about said casing, a dome member connected to the shell, said shell and dome member extending substantially over the entire exterior surface of the casing to cover finger-grippable portions thereof, said shell having on its inner surface circumferentially spaced teeth, said casing having corresponding circumferentially spaced teeth, a resilient flexible coil member between said shell and the casing, the ends of said coil member being adapted to engage said teeth, respectively, when the shell is rotated in one direction only and thereby force the casing to rotate with the shell.

7. An anti-theft tire gauge housing comprising a gauge casing having a portion thereof adapted to be threadedly engaged with the threaded stem of a conventional tire valve, a shell rotatably mounted about said casing, a transparent dome member connected to the said shell extending over a portion of the casing, a transparent dome member connected to the shell and covering the remaining portion of the casing, said shell and casing having on their inner adjacent surfaces circumferentially spaced teeth, a resilient coil member disposed between the teeth of the casing and the teeth of the shell, the ends of the coil member being adapted to engage the teeth of the casing and shell, respectively, when the shell is rotated in one direction and thereby force the casing to rotate with the shell, and to disengage the teeth when the shell is rotated in the opposite direction.

No references cited.

RICHARD C. QUEISSER, *Primary Examiner.*